US006187249B1

(12) United States Patent
Lewellin

(10) Patent No.: US 6,187,249 B1
(45) **Date of Patent: *Feb. 13, 2001**

(54) MANUFACTURE OF BODIES USING RICE HULLS

(75) Inventor: Richard Laurance Lewellin, 2 Raymond Street, Somerville, Victoria 3912 (AU)

(73) Assignee: Richard Laurance Lewellin, Victoria (AU)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/051,145

(22) PCT Filed: Oct. 4, 1996

(86) PCT No.: PCT/AU96/00626

§ 371 Date: Mar. 30, 1998

§ 102(e) Date: Mar. 30, 1998

(87) PCT Pub. No.: WO97/13629

PCT Pub. Date: Apr. 17, 1997

(30) Foreign Application Priority Data

| | | |
|---|---|---|
| Oct. 6, 1995 | (AU) | PN 5852 |
| Oct. 23, 1995 | (AU) | PN 6134 |
| May 21, 1996 | (AU) | PN 9993 |

(51) Int. Cl.[7] .......... B29C 35/12

(52) U.S. Cl. .......... 264/463; 264/491; 264/109; 264/122; 264/123

(58) Field of Search .......... 264/122, 123, 264/109, 118, 463, 491, DIG. 65

(56) References Cited

U.S. PATENT DOCUMENTS

| | | | | |
|---|---|---|---|---|
| 3,207,819 | * | 9/1965 | Raddin et al. | 264/109 |
| 3,668,286 | * | 6/1972 | Brooks et al. | 264/451 |
| 3,927,235 | * | 12/1975 | Chow | 428/292.4 |
| 3,930,089 | * | 12/1975 | Vasishth | 428/212 |
| 4,111,744 | * | 9/1978 | Reiniger | 162/100 |
| 4,162,877 | * | 7/1979 | Nyberg | 425/84 |
| 4,382,847 | * | 5/1983 | Akesson et al. | 522/89 |
| 5,096,409 | * | 3/1992 | Stofko | 425/405.01 |

FOREIGN PATENT DOCUMENTS

| | | |
|---|---|---|
| 4894793 | 5/1994 | (AU) . |
| 6892394 | 7/1995 | (AU) . |
| 2084212 | 4/1982 | (GB) . |

* cited by examiner

*Primary Examiner*—Jan H. Silbaugh
*Assistant Examiner*—Stefan Staicovici
(74) *Attorney, Agent, or Firm*—Greer, Burns & Crain, Ltd.

(57) ABSTRACT

A process is described for forming a body of whole untreated rice hulls by mixing with a heat setting binder. The mixture is formed into a generally desired formed shape of the body, e.g. in a mold or die. The temperature throughout the formed shape is raised until a parameter indicative of or associated with the start of setting of the binder reaches a predetermined level or is observed. The setting of the binder is progressed beyond the start of setting, preferably under different process conditions, until the binder has substantially fully cured. To raise the temperature of the body, an RF field can be applied to cause dielectric heating within the mixture until condensing steam is seen emerging from the body, whereupon application of the RF field is stopped. Another heating process suitable for a porous body comprises creating a pressure differential through the mass and introducing a heated fluid so that the heated fluid passes through the porous mass. To make a denser body, the heated porous mass can be compressed until setting of the binder has occurred, yielding a stable shape having the increased density.

2 Claims, No Drawings

MANUFACTURE OF BODIES USING RICE HULLS

This invention relates to the manufacture of cellulosic bodies, such as bodies in the form of panels, sheets, and other formed shapes, and to products of such processes.

In Australian patent specification No. AU-48947/93 there is described a process for manufacturing bodies composed of a binder mixed with a feed material including rice hulls and/or particles obtained by commuting rice hulls. The binder comprises an RF curable composition. The mixture of the feed material and binder is formed into the generally desired shape of the body e.g. in a mould or in a press, and the binder is cured to form an adherent body having substantially the required shape by applying to the formed shape an RF field of a suitable frequency and intensity and for a suitable period of time to cause dielectric heating within the mixture so as to cure the binder to form the final adherent body. The body is then removed from the mould or press.

It is an object of the present invention to improve the process of forming bodies according to the said patent specification or to provide useful alternative or supplementary processes for forming bodies using rice hulls.

According to the present invention there is provided a process for forming a body of rice hulls, the process comprising: mixing rice hulls with a binder, the binder comprising a composition whose setting requires or is accelerated by heat; forcing the mixture of the rice hulls and binder into a generally desired formed shape of the body at a forming station; raising the temperature substantially throughout the formed shape of the body until a parameter indicative of or associated with the start of setting of the binder reaches a predetermined level or is observed; and progressing the setting of the binder beyond the start of setting until the binder has substantially fully cured. By monitoring the heating to determine the start of setting of the binder, and treating the subsequent curing as a separate process stage, greater control of the process is achieved, and production and product costs and quality can be optimised.

In the preferred process of the present invention, whole or untreated rice hulls form at least a substantial proportion of the feed material since whole rice hulls provide sound and/or thermal insulation as a result of the cavities therein. The reference to "whole" or "untreated" rice hulls is referring to rice hulls after whole rice heads have been threshed to separate the edible grains. "Raw" rice hulls after the threshing operation can have for example between 5% and 10% by weight of fine particles having the consistency of dust. Preferably fines or dust particles are removed before mixing of the rice hulls with the binder. The process may comprise winnowing the raw feed material. For example, the raw feed material may be aerated with an air current being formed to carry away the fine particles, while the current is insufficient to carry the larger fragments of rice hulls. The raw hulls for example can be progressively dropped through a tower with a cross air current or updraft collecting and separating the fines and dust particles. Fine dust particles can effectively soak up a significant proportion of a liquid binder, greater than their proportion by weight in the mixture, probably due to the greater surface area per unit weight of the fine particles compared to the larger particles. For example, dust present in a percentage of 5% to 10% by weight may soak up 10% to 20% by weight of the liquid binder. As a result it has been found that the strength of binding of the formed body is reduced if there is a significant proportion of fine particles.

As an alternative to dropping the rice hulls through a tower, a batch of raw rice hulls may be fluidized in a vessel so that the lighter fine particles are lifted higher enabling them to be drawn off from the vessel. Preferably, also denser particles such as particles of dirt or mineral matter which can contaminate the raw rice hulls material are separated. By fluidizing the raw rice hulls, denser particles such as dirt or grit tend to collect at the bottom of the vessel where they can be separated from the rice hulls.

Preferably, the process further includes separating or inactivating any whole rice grains in the initial feed material. Bulk or raw rice hulls material can have up to 5% of whole rice grains mixed in the hulls, the percentage varying widely depending on the efficiency of the threshing and winnowing processes used to separate the hulls. Whole rice grains mixed within the feed material, if mixed with the binder and bound into the final adherent body, can create problems with use of the product, particularly if the rice seeds remain capable of germinating. For example, if whole rice grains are formed into the body and the body at any stage is exposed to water, including high humidity, the seeds if viable could germinate leading to structural and/or aesthetic physical defects in the product.

The raw feed material may be fluidized in a vessel so that the denser whole grains tend to accumulate at the bottom of the vessel making their removal possible.

Preferably any whole rice grains in the mixture are inactivated by raising the body to a temperature sufficient to sterilize or inactivate any viable seeds, e.g. during the step of raising, the temperature of the formed shape. The temperature throughout the body may be raised to greater than 80° C. and preferably to greater than 90° C.

The process for forming a body of rice hulls may be improved by generally processing the particulate feed material so that the density and/or composition of the mixture formed of the particulate feed material and binder is substantially uniform i.e. inhomogeneities are substantially removed. This processing preferably includes removal of relatively dense particles including contaminating dirt or mineral particles, and preferably removal of whole rice grains as discussed above. The process of making the mixture as uniform as possible preferably also includes removal of fines or dust particles as discussed above.

If desired, the mixture may include additional fillers or substances so as to utilize available feed materials and/or contribute desired properties to the final product. For example, fillers such as straw (which may be chopped or otherwise treated to desirable lengths), hemp fibers, or other cellulose fibers may be incorporated in the feed material together with the whole rice hulls. Fillers or other additives having long fibers can help to bind the rice hulls and can add tensile strength to the final product. Fire retardants, pesticides, fungicides, coloring agents are examples of other additives.

The process utilizes a binder which sets at an elevated temperature. For example, the binder may be suitable thermosetting or thermo-curing resin binder such as a urea formaldehyde or phenolic resin which incorporates a suitable catalyst. The process includes the step of raising the temperature throughout the mixture of the rice hulls and binder when the mixture is formed in a generally desired shape, which may be the final desired shape or an intermediate shape.

In one possible embodiment, the mixture of rice hulls and binder is located in a mould or die at the forming station so that the mixture is in the generally desired final shape of the product to be formed, the heat being applied to the mixture by conduction from the mould or die. For example the mould or die may be directly heated e.g. by an adjacent gas flame so that the hot combustion products contact and heat the mould or die. Alternatively electrical resistive heating elements may be incorporated in the mould parts or dies so as to electrically heat the mould. As a further alternative, inductive heating of the mould parts may be achieved by providing windings in proximity to the die parts so that high frequency alternating current in the windings induces currents in the die thereby heating the same.

RF induced dielectric heating of the water content of the mixture is another heating option. When the formed shape of the body includes a significant water content throughout the body, the step of raising the temperature may comprise application to the formed shape of an RF field of a suitable frequency and intensity to cause dielectric heating of water within the formed shape of the body. The parameter indicative of or associated with the start of setting of the binder comprises the appearance of condensing steam emerging from the body. Preferably the application of the RF field is discontinued substantially immediately upon or shortly after the appearance of the emerging condensing steam. It has been found that continued application of the RF field for a substantial period after the appearance of condensing steam can lead to an electrical arc or discharge between the metal field plates, this discharge burning or damaging the formed body.

In a further possible embodiment, the formed shape comprises a porous mass and heated fluid, particularly a heated gas such as heated air or steam, may be caused to flow under a pressure differential created through the formed shape within a mould or die cavity so that the passage of the heated fluid through the porous mixture causes direct heating throughout the thickness to initiate setting of the binder. For example, the body may be shaped between opposed perforated plates through which the heated fluid passes. The formed shape of the body may comprise a panel having opposed outer faces and side edges around the perimeter of the outer faces, the panel including an impervious sheet such as a laminating face sheet covering at least one of the outer faces and which becomes bound to the body. The pressure differential is created between different portions of the side edges so that the heated fluid passes through the panel between the side edges and generally parallel to the outer faces.

To make a dense body of low porosity, the heated fluid may be passed through a porous mass until the start of setting of the binder is about to commence or has just commenced and then the porous mass is compressed to a smaller volume creating a significantly denser body and the mass is held compressed until setting of the binder has occurred yielding a stable shape having the increased density.

It is also possible to extrude the mixture through a die having the desired shape. The mixture can be heated in the die so that by the time the product is emerging from the die, the binder has set sufficiently for the emerging product to retain the required shape. The heating of the mixture as it is being forced through the die may be achieved by heating of the die surfaces, e.g. by direct contact with combustion products, or by resistance or inductive electrically heating of the die. The feed material comprising a mixture of whole rice hulls (with or without other ingredients such as fillers) and the binder can be fed and simultaneously compressed in an auger so as to enter the heated extrusion die under pressure. The inside surfaces of the die may be treated so as to reduce friction or resistance e.g. by being coated with a non-stick material such as known under the trade mark Teflon. This, extrusion process will be suitable for continuous manufacture of a product such as pipe insulation lagging which can have a substantially annular cross-sectional shape with a split to receive a pipe to be insulated.

In a further embodiment, the step of forming the mixture comprises first locating the mixture in an enclosed sealed mould cavity and secondly compressing the mixture by substantially reducing the volume so that the internal pressure in the cavity is raised and consequently the temperature of the material s in the mould cavity increases.

Whichever method of raising the temperature of the mixture is used, and whichever system for forming the mixture into a formed shape is used, the step of progressing the setting of the binder preferably comprises subjecting the formed shape to different process conditions to those existing at the start of setting of the binder.

In one preferred embodiment, the binder sets upon the parameter reaching the predetermined level (e.g. when the mixture reaching a predetermined temperature throughout, or when the mixture being subjected to a predetermined temperature for a predetermined time) so that the formed shape of the body has a stable shape substantially upon reaching the start of setting. The step of progressing the setting of the binder may include removing the formed shape of the body from the forming station (e.g. from the mould or die) and further treating the body in its stable shape so as to cure the binder to approach or reach its full strength. The surprising finding that the formed shape becomes sufficiently stable to enable handling upon the start of setting of the binder leads to the ability to separate the full curing process from the start of setting of the binder. This enables efficient use of the equipment used to form the mixture to the formed shape and equipment used to raise the temperature throughout the formed shape. For example, in the embodiment using an RF field to cause dielectric heating within the mixture so as to set the binder sufficiently to form the body of stable shape, the step of further treating the body may comprise further heating of the body by application of conductive or radiant heat so that the binder is substantially fully cured. The other possible heating processes described above similarly can produce a stable formed shape in a short time which can be processed separately from the heating system until the binder is cured to full strength.

For some binders the time interval between the mixing of the binder with the rice hulls and raising the temperature is preferably substantially less than 20 minutes, more preferably less than 10 minutes and desirably less than one minute, e.g. about 30 seconds. In specification No. AU-48947/93 it is stated that because rice hulls are water resistant, the addition of water based compositions does not result in significant absorption of the water into the rice hulls. However, contrary to this indication, it has been found that mixing of an aqueous binder with the rice hulls substantially more than 10 minutes and particularly more than 20 minutes before curing of the binder can lead to significant absorption of water by the rice hulls. This, in turn, can lead to reduction in the effectiveness of binding of the particles so that a formed body when cured can have less strength and can have a surface which is friable or crumbly or is more easily damaged by rubbing or impact. Furthermore when the mixture is formed into the generally desired shapes, if the mixture has had the binder mixed with the rice hulls more than 10 minutes before shaping, the formed body after heating to start setting of the binder tends to spring back or expand slightly upon removal of the compressive force from the body. This is believed to be due to some setting or curing of the binder having already taken place before the compression and application of heat.

However by mixing the liquid binder with the rice hulls, compressing the mixture to the desired shape, and starting setting of the binder as quickly as possible after mixing, the strength of binding is maximized (given all other conditions being equal) and the formed body retains the required shape that it had during the step of starting setting of the binder.

The process may include addition of a pH adjusting material, e.g. an alkaline material so as to adjust the pH of the final formed product. Natural rice hulls in their raw state can have a pH of about 7.7, although this can vary depending on the source of the rice crop. However the binders, or the catalysts used in binders, are often acidic so that the final pH of the formed product can be for example in the range 5.9 to 6.3.

By adjusting the pH of the mixture, e.g. by adjusting the pH of the liquid binder, the formed body may have any desired pH consistent with the purpose for which the body is to be used. For most applications, e.g. products for the building industry, a substantially neutral pH, e.g. in the range 6.5 to 7.2 will be preferred. Addition of dolomite or lime, or like material, to the binder or to the mixture at the time of forming the mixture of the feed material and binder, may be sufficient to increase the pH to the desired level. Chemical pH adjusting agents may likewise be used. pH testing of the initial raw feed material is preferable so that the amount of pH adjusting additive can be determined to compensate for differing pH of the initial raw feed material.

The formed shape may incorporate a reinforcing material such as a metal mesh or fiber reinforcing mat to contribute tensile strength to the final body, e.g. for structural strength bodies for use in buildings. Tests suggest that a metal mesh (not electrically connected to earth or to either the metal plates through which RF field is applied) shortens the time for increasing the temperature throughout the formed shape when using RF dielectric heating.

The processes described herein in which there is direct heat transfer to the mixture while it is in the desired formed shape, and particularly the heating by conduction from the surfaces of a mould or die in which the mixture is confined, are particularly suitable for forming products having a thickness of the body up to about 6 cm. Because the rice hulls are effective thermal insulators, surface conduction heating is unsuitable for thicknesses in the order of for example, 10 cm (which may be needed for acoustic insulation for use in building wall cavities). In the case of such relatively thick bodies, the RF dielectric heating or the forcing of heated fluid air or steam through the porous body so as to reach throughout the thickness are suitable heating processes.

The processes according to the present invention can be used for producing a wide: range of products such as pipe insulation lagging which can have a wall thickness up to about 5 cm. Other possible products include ceiling panels having a thickness of about 2 cm. Other possible products include cores for doors or building panels with surface laminations being applied during or after formation of the core material to provide external surfaces having the desired finish.

What is claimed is:

1. A process for forming a body of rice hulls, including: mixing rice hulls with a binder, the rice hulls being substantially whole untreated rice hulls with their edible rice grains removed, the rice hulls being processed to be of substantially uniform density by separating relatively dense particles and removing fines or dust particles prior to mixing with the binder, the binder comprising a composition whose setting requires or is accelerated by heat; forming the mixture of the rice hulls and binder into a formed shape of the body by placing the mixture in a mold at a forming station and closing the mold, the formed shape of the body including a water content throughout the formed body; raising the temperature substantially throughout the formed shape of the body in the mold until a parameter indicative of or associated with the start of setting of the binder reaches a predetermined level or is observed, the start of setting of the binder being defined by the formed shape of the body in the mold achieving a stable shape enabling opening of the mold and removal therefrom of the formed shape, the step of raising the temperature including application to the formed shape of an RF field of a suitable frequency and intensity to cause dielectric heating of water within the formed shape of the body, the parameter indicative of or associated with the start of setting of the binder comprising the appearance of condensing steam emerging from the body; removing the formed shape from the mold at the conclusion of the step of raising the temperature; and, in a separate and further step, curing the binder by progressing the setting of the binder in the formed shape beyond the start of setting by further treating the body in its stable shape under different process conditions than those from the step of raising the temperature, the step of progressing the setting of the binder including the step of discontinuing application of the RF field heating substantially immediately upon the appearance of the emerging condensing steam, to prevent burning or damaging the formed body from at least one of excessive heating and electrical arcing from the RF field.

2. The process of claim 1, wherein the step of further treating the body includes further heating of the body by application of conductive or radiant heat so that the binder is substantially fully cured.

* * * * *